(12) United States Patent
Seppanen et al.

(10) Patent No.: US 8,614,988 B2
(45) Date of Patent: Dec. 24, 2013

(54) METHOD FOR PERFORMING A RICH CALL CAPABILITY INDICATION IN A MOBILE COMMUNICATION SYSTEM

(75) Inventors: Juho Seppanen, Helsinki (FI); Frans Tuomela, Helsinki (FI); Tomi Kinnari, Helsinki (FI)

(73) Assignee: TeliaSonera AB, Stockholm (SE)

( * ) Notice: Subject to any disclaimer, the term of this patent is extended or adjusted under 35 U.S.C. 154(b) by 209 days.

(21) Appl. No.: 13/081,731

(22) Filed: Apr. 7, 2011

(65) Prior Publication Data

US 2011/0249650 A1 Oct. 13, 2011

(30) Foreign Application Priority Data

Apr. 9, 2010 (EP) .................................... 10159509

(51) Int. Cl.
H04W 4/00 (2009.01)
H04W 36/00 (2009.01)
H04L 12/66 (2006.01)

(52) U.S. Cl.
USPC ............................ 370/331; 370/352; 455/436

(58) Field of Classification Search
USPC .......... 370/357–388, 259–271, 331, 352–356
See application file for complete search history.

(56) References Cited

U.S. PATENT DOCUMENTS

| | | | | |
|---|---|---|---|---|
| 6,035,179 | A * | 3/2000 | Virtanen | 455/63.1 |
| 2001/0030953 | A1 * | 10/2001 | Chang | 370/331 |
| 2004/0004957 | A1 | 1/2004 | Rabipour et al. | |
| 2008/0069028 | A1 * | 3/2008 | Richardson | 370/328 |
| 2009/0180463 | A1 * | 7/2009 | Yang et al. | 370/349 |

FOREIGN PATENT DOCUMENTS

WO 2004/004187 A2 1/2004

OTHER PUBLICATIONS

"3rd Generation Partnership Project; Technical Specification Group Services and System Aspects; Combining Circuit Switched (CS) and IP Multimedia Subsystem (IMS) service; Stage 2 (Release 9)" 3GPP Standard; 3GPP TS 23. 279, 3rd; Generation Partnership Project (3GPP), Mobile Competence Centre; 650, Route Des Lucioles: F-06921 Sophia-Antipolis Cedex; France, no. V9. 0.0, Dec. 11, 2009, pp. 1-36, [retrieved on Dec. 11, 2009], p. 5, paragraphs [0001], [03.1], [06.1], [07.1], [T2.1], Cited in European Search Report.

European Search Report, dated Aug. 31, 2010, from corresponding European application.

* cited by examiner

Primary Examiner — Habte Mered
Assistant Examiner — Yaotang Wang
(74) Attorney, Agent, or Firm — Young & Thompson

(57) ABSTRACT

The invention relates to a method for establishing a circuit switched call between a first electronic device and a second electronic device over a circuit switched communication system, exchanging of capabilities of the first electronic device and the second electronic device, establishing a media component between the first electronic device and the second electronic device over a packet switched communication system. In the method also radio access network information is obtained to the first electronic device. The first electronic device requests an in-band signal to the second electronic device for indicating an availability of a type of the media component. The second electronic device detects the in-band signal in the second electronic device and indicates the availability of the type of the media component on a user interface of the second electronic device.

15 Claims, 6 Drawing Sheets

METHOD FOR PERFORMING A RICH CALL CAPABILITY INDICATION IN A MOBILE COMMUNICATION SYSTEM

BACKGROUND OF THE INVENTION

1. Field of the Invention

The invention relates to mobile communications comprising the exchange of video or data in association with a circuit switched call. Particularly, the invention relates to a method for performing a rich call capability indication in a mobile communication system.

2. Description of the Related Art

Rich Communication Suite (RCS) is a concept introduced by the GSM Association (GSMA) to represent advanced 3G services typically enabled by the IP Multimedia Subsystem (IMS) standards defined by 3G Partnership Project (3GPP). RCS contains typically session services that involve at least two media components transmitted between the session parties. The media components may comprise audio, video, still picture sequences, whiteboard, text, unstructured binary data and messages. Typically, there is a voice component that is augmented with a visual media component which may comprise still or moving image data. In order to cater for increased bitrates for the visual media component or any other media component transmitted in parallel with a voice component, the voice component may be transmitted over a Circuit Switched (CS) call, in other words, a bearer in accordance with the 3GPP standards 23.279 and 24.279 on combining CS services and IMS services. In this case the voice media component is transmitted in the form of a CS voice call, whereas a video media component is transmitted over Packet Switched (PS) data. The providing of the voice component as a CS call is useful, because GPRS PS data has a rather restricted upper bitrate capability, for example, in 80 kbit/s for downlink data when uplink bitrate is 20 kbit/s. The moving of the voice component to the CS side of a GSM system frees data transmission capacity from PS side. The quality of service obtainable via PS data for a voice call may also vary and may in some cases be inferior to the quality of service obtainable via a CS bearer. In 2G networks PS side is in a non-active state, which means that in networks not supporting Dual Transfer Mode (DTM), video sharing is not possible during a CS call.

Reference is now made to FIG. 1, which illustrates a communication system providing Combination of CS and IMS Services (CSI) in prior art. In FIG. 1 there are illustrated two Mobile Stations (MS), namely MS 100 and MS 180. MS 100 comprises an IMS client 102 and a CS Mobile Terminal (MT) function 104, whereas similar MS 180 also comprises an IMS client 182 and a CS Mobile Terminal (MT) function 184, respectively. MS 100 communicates with a Radio Access Network (RAN) 112 comprising a base station 112. MS 180 communicates with a RAN 170 comprising a base station 172. RAN 112 and RAN 170 may comprise, for example, a GSM BSS, a UMTS RAN, an Edge RAN, a 4G RAN or a short range RAN such as a WLAN or WiMAX LAN. Communicating with RAN 110 and RAN 170 there are respective PS Core networks 120 and 160, and CS Core networks 122, 162. PS Core networks 120 and 160 act as IP Connectivity Access Networks (IP-CAN) for IMS Core networks 130 and 150. IMS Core networks 130 and 150 communicate via an IP network 140 such as an inter-operator backbone network, a GPRS Roaming eXchange (GRX) network, Global Roaming eXchange (GRX) network, IP Packet eXchange (IPX) network, an Intranet or the Internet. CS Core networks 122 and 162 communicate via PSTN 142. Between IMS client 102 and IMS client 182 there is established a media component for video 190 via SIP signaling 191. SIP signaling 191 traverses in PS Core 120 an SGSN (not shown) and a GGSN (not shown). In IMS Core 130 SIP signaling 191 traverses a Proxy Call State Control Function (P-CSCF) and a Serving CSCF (S-CSCF), which are not shown in FIG. 1. SIP signaling 191 may also traverse a Inquiring CSCF (I-CSCF). Similar network elements may also be present in IMS Core 150. A CS signaling 193 between CS MT 104 and CS MT 184 may be in the form of Signaling System (SS) No. 7 ISDN User Part (ISUP) signaling, whereas the CS path 192 comprises a number of CS connections through CS Core 122, PSTN 142 and CS Core 162. It should be noted that the number of networks and the network structure in FIG. 1 is only for illustrative purposes, it is also possible, for example, that MS 100 and MS 180 share the same network operator and share the same PS and CS core networks. In this case there is no need to route signaling via IP network 140 or PSTN 142.

In order to support cases where a multimedia session is established to carry a visual media component such as video after the establishment of a CS to speech state, it is necessary to exchange information about the current capabilities of the serving RAN, the serving core network and the mobile equipment. The exchange involves information such as whether the terminal is capable of simultaneous CS and PS services, IP Multimedia (IM) status, UE capability version and personal Mobile Equipment (ME) identifier. IM status indicates whether the terminal supports IMS and willing to register to IMS in order to perform UE capability exchange via SIP OPTIONS operation as part of SIP signaling illustrated with arrow 191.

Reference is now made to FIG. 2, which illustrates capability information exchange between mobile equipment in a communication system in accordance with the 3GPP standards 23.279 and 24.279 in prior art. In FIG. 2 the starting point is that the user of MS 100 starts the establishment of a CS call towards MS 180. CS MT 104 sends a setup message 201 to an MSC (not shown) in CS Core 110. Setup message 201 comprises a User-User Information Element (UUE IE) that specifies protocol identifier for 3GPP capability exchange, radio environment set to value 1, IM status set to value "IM subsystem capable and willing to register to IM subsystem", personal ME identifier and UE capability version. The UUE IE element in setup message 201 is transferred to an Initial Address Message (IAM) message 202, which is sent from CS Core 122 to PSTN 142. A further IAM message 203 carrying the UUE IE to an MSC (not shown) in CS Core 162 is sent from PSTN 142. The MSC in CS Core 162 sends the UUE IE to CS MT 184 within MS 180 in a setup message 204. CS MT 184 may send in response a progress message and an alerting message which are not shown for clarity purposes. When the called party answers, CS MT 184 within MS 180 sends a connect message 205 to the MSC in CS Core 162. Connect message 205 carries called party related capability information such as User-User Information Element (UUE IE) that specifies protocol identifier for 3GPP capability exchange, radio environment set to value 1, IM status set to value "IM subsystem capable and willing to register to IM subsystem", personal ME identifier and UE capability version. The MSC in CS Core 162 sends an Answer Message (ANM) 206 comprising the UUE IE to PSTN 142 in response to the receiving of connect message 205. PSTN 142 sends an ANM message 207 comprising the UUE IE to the MSC in CS Core 122. The MSC in CS core 122 sends a connect message 208 comprising the UUE IE to CS MT 104 in response to ANM message 207.

After the CS call reaches the speech state via the exchange of messages 205-208, IMS clients 102 and 182 exchange their UE capabilities via SIP OPTIONS operations, provided that the IM status values they have receive are set to "IM subsystem capable and willing to register to IM subsystem" and that the radio environment is set to value 1, which indicates simultaneous support of PS and CS services or generally that IMS client 102 and IMS client 182 are capable of initiating a PS connection to IMS along with the ongoing CS call. Thereupon, IMS clients 102 and 182 register to their respective IMS cores 130 and 150 if no such registration has been performed. Thereupon, IMS client 102 sends a SIP OPTIONS operation 209 to IMS core 130. SIP OPTIONS operation 209 carries the UE capabilities of IMS client 102 within MS 100. The UE capabilities include information such as support for different possible IMS media types, particularly, video and still picture, media format parameters, personal ME identifier to identify which of the user's MEs the UE capability information is related to and UE capability version to label the capabilities carried in SIP OPTIONS operation 209. IMS core 130 sends the UE capabilities in a SIP OPTIONS operation 210 to IMS core 150. IMS core 150 sends the UE capabilities to IMS client 182 in a SIP OPTIONS operation 211. In response to SIP OPTIONS operation 211, IMS client 182 sends a 200 OK operation to IMS client 102, as illustrated with arrows 212-214. In order to inform its UE capabilities to the remote IMS client, IMS client 102 performs a similar SIP OPTIONS operation with IMS client 182, as illustrated with arrows 215-220. At some point in time the user of either MS 100 or MS 180 wants to initiate the establishment of a parallel video or still picture media component over IMS, which is illustrated with arrows 221-223. The establishment is performed using the SIP INVITE operation.

Significant amount of signaling would need to be performed between MS 100 and 180 in order to keep up-to-date information especially pertaining to radio environment capabilities, as the mobile stations may perform frequent handovers between 2G and 3G. The problem with existing solutions illustrated in FIGS. 1 and 2 is that the changed UE capabilities can not be indicated to the remote party using the SIP OPTIONS operations, if PS connection changes to non-active state, which means that it cannot be used when moved from 3G to 2G due to handover to a system that does not allow simultaneous CS and PS connection, for example, a 2G system. Dual mode transfer requires of the network support for simultaneous CS and PS data. Dual Transfer Mode (DTM) is defined, for example, in 3GPP specification 43.055.

SUMMARY OF THE INVENTION

The invention relates to a method for establishing a circuit switched call from a first electronic device to a second electronic device over a circuit switched communication system and establishing a media component between the first electronic device and the second electronic device over a packet switched communication system. The method is characterized by obtaining radio access network information to the first electronic device; and requesting an in-band signal transmission to the second electronic device for indicating availability of packet switched data transfer during the circuit switched call.

The invention relates also to a system for establishing a media component in addition to a circuit switched call, comprising: a first electronic device; a second electronic device; and a circuit switched network a packet switched network. The system is characterized by the first electronic device is configured to obtain radio access network information, to request an in-band signal transmission to the second electronic device for indicating an availability of packet switched data transfer during the circuit switched call; and the second electronic device is configured to detect the in-band signal and to indicate an availability of at least one type of media component during the circuit switched call on a user interface.

The invention relates also to an electronic device for establishing a circuit switched call to a second electronic device over a circuit switched communication system and establishing a media component to the second electronic device over a packet switched communication system. The electronic device is characterized by means for obtaining radio access network information; means for requesting an in-band signal transmission to the second electronic device for indicating availability of packet switched data transfer during the circuit switched call; means for detecting the in-band signal; and means for indicating availability of at least one type media component during the circuit switched call on a user interface. The invention relates also to a computer program comprising code adapted to perform the following steps when executed on a data-processing system: establishing a circuit switched call between a first electronic device and a second electronic device over a circuit switched communication system and establishing a media component between the first electronic device and the second electronic device over a packet switched communication system. The computer program is characterized by obtaining radio access network information to the first electronic device; and requesting an in-band signal to the second electronic device for indicating an availability of packet switched data transfer during the circuit switched call.

In one embodiment of the invention, the second electronic device detects the in-band signal in the second electronic device and indicates the availability of at least one type of media component during the circuit switched call on a user interface of the second electronic device. A media component type may comprise, for example, all visual media components, any games, any data sharing between applications, any messaging. A type of a media component may also be all media components except voice. A type of a media component may also be a particular media encoding. The indication may provide information whether such a media component may be established in future during the circuit switched call, provided that the first electronic device remains in similar radio environment regarding simultaneous support of PS data transfer during a CS call. The indication may be, for example, an icon, a text or any kind of visual symbol.

In one embodiment of the invention, the second electronic device detects the in-band signal in the second electronic device and indicates the availability of packet data transfer during the circuit switched call on a user interface of the second electronic device.

In one embodiment of the invention, the in-band signal indicates the availability of at least one type of media component during the circuit switched call by virtue of revealing whether packet switched data may be transferred simultaneously with a circuit switched call. The PS data may comprise a media component. The in-band signal may indicate whether Dual Transfer Mode (DTM) is supported or not.

In one embodiment of the invention, a handover indication is received in the first electronic device. In the handover indication or in a separate handover related message radio access network information is received to the first electric device. The radio access network related information may indicate whether the radio access network is a 2G network, a 3G network or a 4G network. The radio access network related information may indicate to the first electronic device or may be used by the first electronic device to determine whether the radio access network or an IP-CAN associated with it supports simultaneous circuit switched call and packet switched session carrying at least one media component.

In one embodiment of the invention, the user of the first or the second electronic device may activate from the user interface of the electronic device a feature for indicating the availability of the type of the media component.

In one embodiment of the invention, the first electronic device may request a start of the in-band signal from a core network node associated with the first electronic device.

In one embodiment of the invention, the core network node may be a mobile switching center or a mobile switching center communicating with a media proxy entity such as a media gateway.

In one embodiment of the invention, the first electronic device may allow the in-band signal to play long-enough to avoid distortion due to at least one of speech coding and radio transmission errors.

In one embodiment of the invention, the first electronic device may request a stop of the in-band signal from a core network node associated with the first electronic device.

In one embodiment of the invention, the core network node comprises a mobile services switching center or a mobile services switching center server.

In one embodiment of the invention, radio access network information may be obtained to an execution environment within the first electronic device or the second electronic device.

In one embodiment of the invention, the radio access network information is obtained to an execution environment within the first electronic device. The execution environment may request the sending of the in-band signal via the electronic device. The request may be sent to a core network node such as an MSC or MSC server.

In one embodiment of the invention, the execution environment may be a software component in a memory of the electronic device. The execution environment may be a software component in a subscriber identification module such as a SIM card, USIM, or any smart card that may be plugged in the first or the second electronic device.

In one embodiment of the invention, the first electronic device and the second electronic devices comprise mobile communication network mobile stations.

In one embodiment of the invention, the packet switched communication system comprises an IP multimedia subsystem.

In one embodiment of the invention, the at least one type of media component comprises at least one of a video stream, a still picture sequence and a data message sequence.

In one embodiment of the invention, the in-band signal comprises at least one Dual Tone Multiple Frequency (DTMF) signal. The in-band signal may be received by a DTMF receiver in the electronic device.

In one embodiment of the invention, the system comprises at least one of AMPS, GSM, UMTS, GPRS and CDMA2000.

In one embodiment of the invention, the first electronic device or the second electronic device comprises a User Equipment (UE).

In one embodiment of the invention, said system comprises a mobile communication network. In one embodiment of the invention, the mobile node, in other words, a User Equipment (UE) comprises a mobile station or generally a mobile terminal. In one embodiment of the invention a user of a mobile terminal is identified using a subscriber module, for example, User Services Identity Module (USIM) or a Subscriber Identity Module (SIM). The combination of Mobile Equipment (ME) and a subscriber module may be referred to as a mobile subscriber.

In one embodiment of the invention, the communication system comprises at least one of a Global System of Mobile Communications (GSM) network, a Universal Mobile Telephone System (UMTS) network and a 4G system such as LTE Evolved Packet System (EPS). The first and the second electronic device may be, for example, a GSM mobile station or a UMTS mobile station or an EPS user equipment with a dual mode or multimode functionality to support different access types.

In one embodiment of the invention, the computer program is stored on a computer readable medium. The computer readable medium may be a removable memory card, a removable memory module, a magnetic disk, an optical disk, a holographic memory or a magnetic tape. A removable memory module may be, for example, a USB memory stick, a PCMCIA card or a smart memory card.

The embodiments of the invention described hereinbefore may be used in any combination with each other. Several of the embodiments may be combined together to form a further embodiment of the invention. A method, a system, an apparatus, a computer program or a computer program product to which the invention is related may comprise at least one of the embodiments of the invention described hereinbefore.

The benefits of the invention are related to improved availability information regarding further media components to be added to a circuit switched call.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION OF THE EMBODIMENTS

Reference will now be made in detail to the embodiments of the present invention, examples of which are illustrated in the accompanying drawings.

Figure 1:
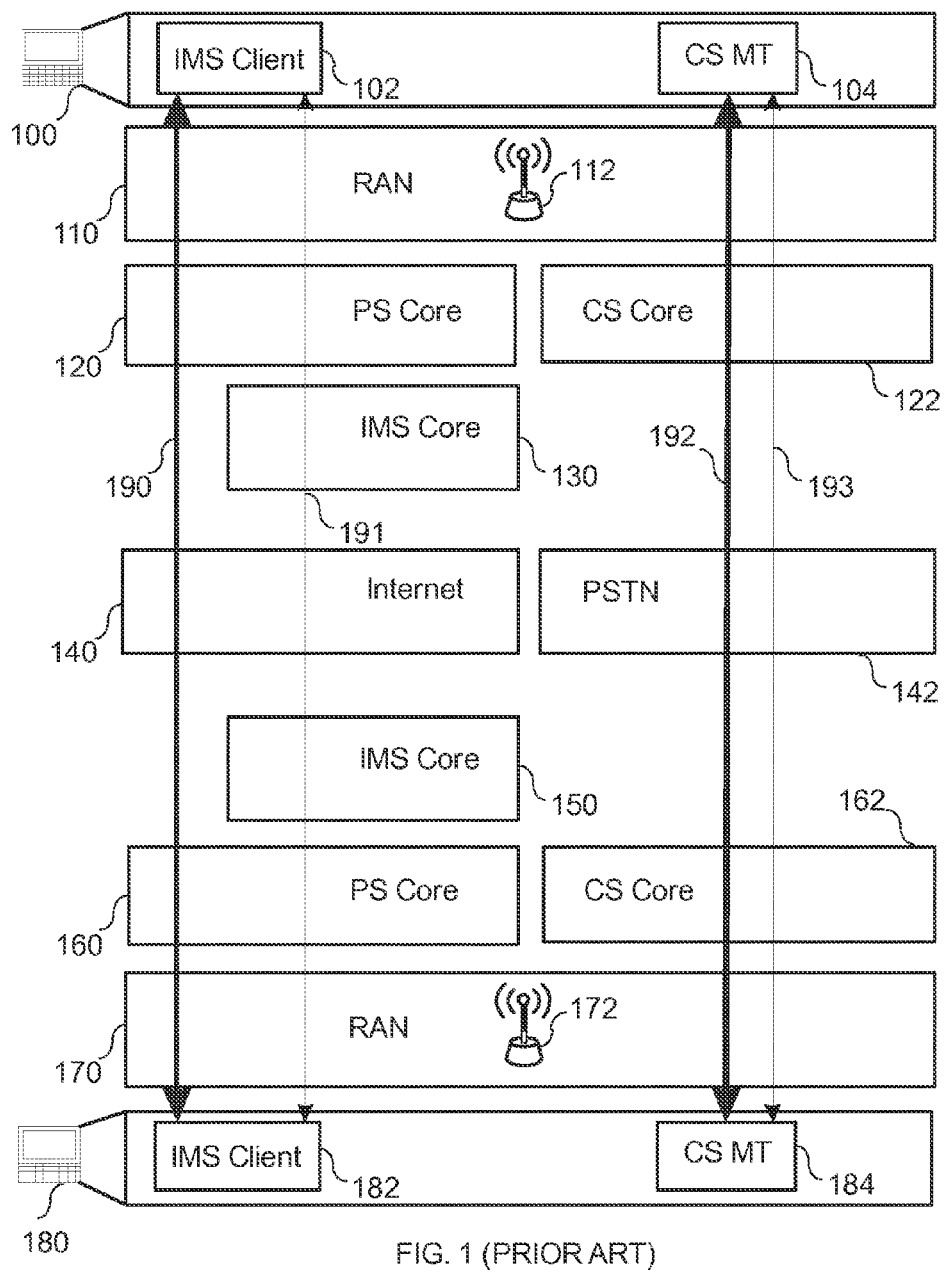
FIG. 1 is a block diagram illustrating a communication system providing Combination of CS and IMS Services (CSI) in prior art.
Figure 2:
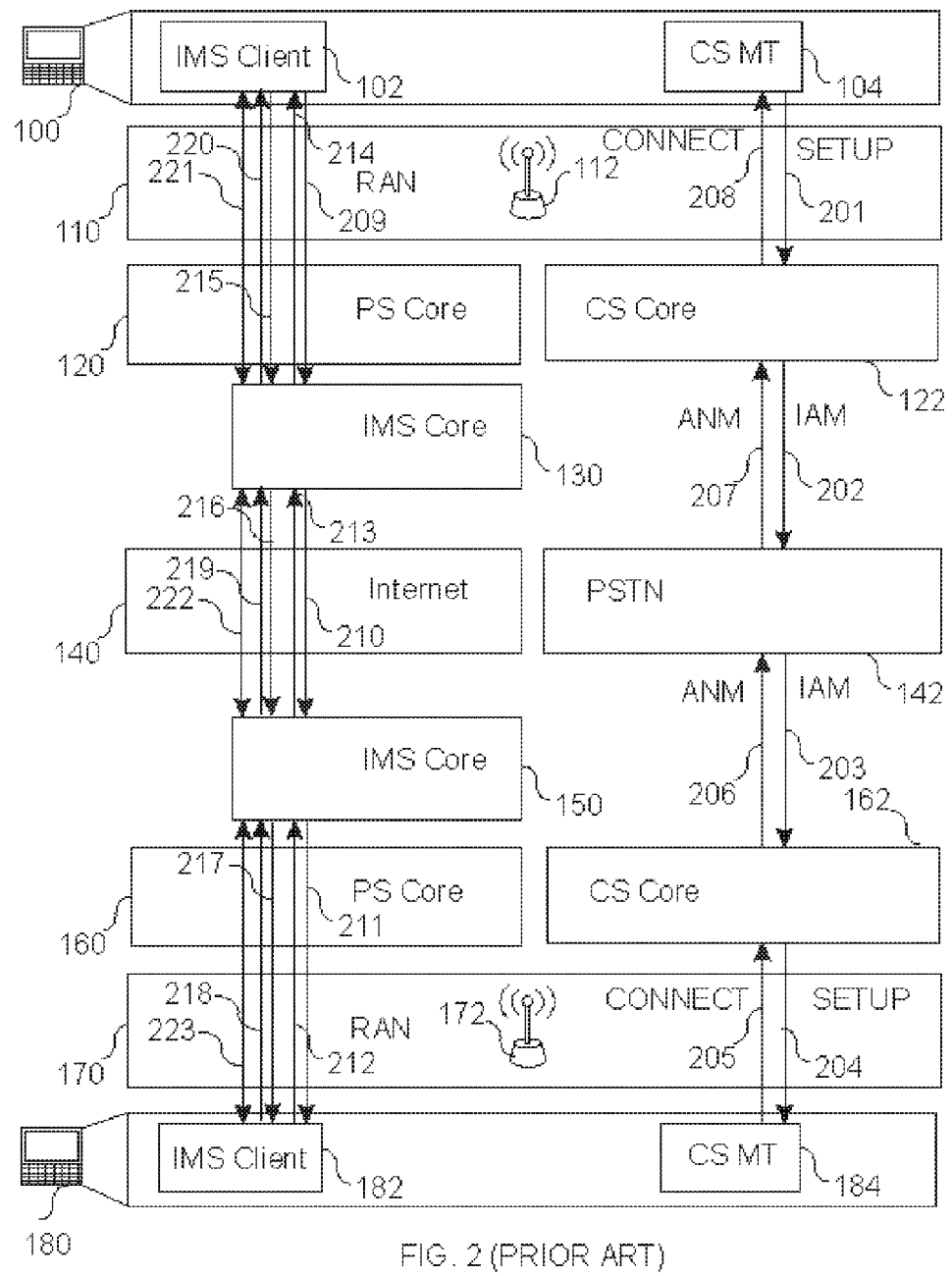
FIG. 2 is a block diagram illustrating capability information exchange between mobile equipment in a communication system in prior art.
Figure 3A:
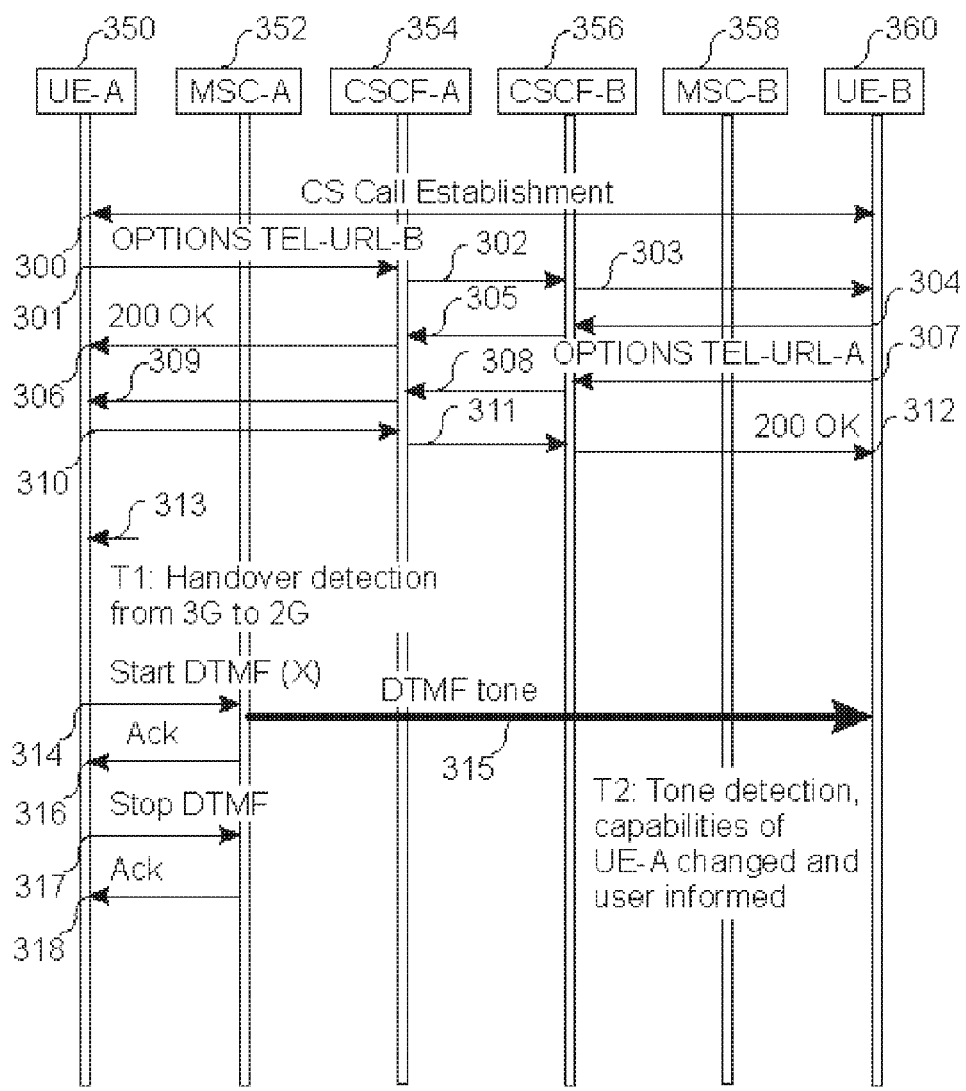
FIG. 3A is a message sequence chart illustrating a circuit switched call and subsequent user equipment capability exchange in one embodiment of the invention.

FIG. 3A is a message sequence chart, in other words, a signaling diagram illustrating a circuit switched call and subsequent user equipment capability exchange in one embodiment of the invention. The starting point in FIG. 3A is that a CS call 300 is established between a UE-A 350 and a UE-B 360. UE-A 350 and UE-B 360 are user equipments that may comprise dual system capabilities which allow them to use both a 2G network and a 3G core networks (not shown) or a 4G network. UE-A 350 and UE-B 360 are provided with UMTS or GSM subscriber identification modules that permit them to register to core networks as mobile stations such as illustrated in FIGS. 1 and 2. CS call 300 is established via a MSC-A 352 and a MSC-B 358. CS call 300 may be established from either party. CS call 300 setup signaling via MSC-A 352 and MSC-B 358 may carry UUE IEs that provide a protocol identifier for 3GPP capability exchange, radio environment set to value 1, IM status set to value "IM subsystem capable and willing to register to IM subsystem", personal ME identifier and UE capability version regarding UE-A 350 and UE-B 360 to a respective remote UE. In one embodiment of the invention, no UUE IEs are carried in CS call 300 setup signaling.

After the establishing of CS call 301, UE-A 350 and UE-B 360 register to IMS, if they are not already registered, for example, due to an always-on registration required by, for example, push E-mail and Push-to-talk over Cellular (PoC) features. The registration is not shown in FIG. 3A. UE-A 350 sends a SIP OPTIONS operation 301 to a URI of a public user identity of the called party. The URI may be a tel-URI. SIP OPTIONS operation 301 comprises UE capabilities regarding UE-A. The UE capabilities include information such as, for example, support for different possible IMS media types, particularly, video and still picture, media format parameters, personal ME identifier to identify which of the user's MEs the UE capability information is related to and UE capability version to label the capabilities carried in SIP OPTIONS operation 301 when a later reference is made to these capabilities in association with a subsequent CS or PS call. SIP OPTIONS operation 302 carrying UE-A capabilities is sent from a CSCF-A 354 to CSCF-B 356. Operation 302 may traverse intermediate network elements such as I-CSCFs. SIP OPTIONS operation 303 carrying UE-A capabilities is sent from a CSCF-B 356 to UE-B 360. UE-B 360 responds with positive response 200 OK illustrated with arrows 304-306, which acknowledges SIP OPTIONS operation pertaining to UE-A capabilities. Thereupon, UE-B 360 sends a SIP OPTIONS operation 307 to a URI of a public user identity of the calling party. The URI may be a tel-URI. SIP OPTIONS operation 307 comprises UE capabilities regarding UE-B. The UE capabilities include information such as support for different possible IMS media types, particularly, video and still picture, media format parameters, personal ME identifier to identify which of the user's MEs the UE capability information is related to and UE capability version to label the capabilities carried in SIP OPTIONS operation 307 when a later reference is made to these capabilities in association with a subsequent CS or PS call. SIP OPTIONS operation 308 carrying UE-B capabilities is sent from a CSCF-B 356 to CSCF-A 354. Operation 308 may traverse intermediate network elements such as I-CSCFs. SIP OPTIONS operation 309 carrying UE-B capabilities is sent from a CSCF-A 354 to UE-A 350. UE-A 350 responds with positive response 200 OK illustrated with arrows 310-312, which acknowledges SIP OPTIONS operation pertaining to UE-B capabilities. At time T1 a handover is detected by UE-A 350 in the form of a message 313 which may be, for example, a handover complete message. From message 313 UE-A 350 determines the current support for establishing a PS media component via CSCF-A 354 and CSCF-B 356 to UE-B 360. The current support is determined, for example, from whether the current serving network is a 2G, a 3G or a 4G network. UE-A 350 sends a start Dual-Tone Multi-Frequency (DTMF) operation 314 to anchor MSC-A 352. In response to start DTMF operation 314, MSC-A 352 starts sending a first in-band signal to UE-B 360, as illustrated with arrow 315. MSC-A 352 acknowledges the starting of the sending of the first in-band signal with operation Ack 316 to UE-A 350. The first in-band signal may be a DTMF tone or any other in-band signal. UE-A 350 requests the stopping of the sending of the first in-band signal with operation stop DTMF 317. The operation stop DTMF 317 is acknowledged by MSC-A 352 using operation Ack 318.

The first in-band signal is played long-enough to ensure a high-enough probability of correct detection at UE-B 360 end. The playing time may be, for example, longer than 0.5 seconds. At time T2 UE-B 360 detects the first in-band signal and indicates via the user interface of UE-B 360 the current support for the sending of a visual media component between UE-A 350 and UE-B 360. The indication may be determined from the support of a PS connection on both sides and showing of the support for the sending of the visual media component only when both sides support a PS connection for the visual media component.

In one embodiment of the invention, the UE capability exchange between UE-A 350 and UE-B 360 that uses SIP OPTIONS operations, as illustrated with arrows 301-312 in FIG. 3A, may not be used.

In one embodiment of the invention, the UE capability exchange between UE-A 350 and UE-B 360 that uses SIP OPTIONS operations, as illustrated with arrows 301-312 in FIG. 3A, is replaced or supplemented with an exchange of second in-band tones between UE-A 350 and UE-B 360 that reveals whether the terminals support the feature of indicating using in-band tones the current support for the establishment of a visual media component between UE-A 350 and UE-B 360.

In one embodiment of the invention, UE-A 350 may request the starting of the sending of the first in-band signal always when a handover is performed to a new radio access network that results in a change in the availability of the transmission of the visual media component over a PS connection.

In one embodiment of the invention, UE-A 350 may request the starting of the sending of the first in-band signal always when a handover is performed to a new radio access network that results in a change in the availability of the sending of the visual media component over a PS connection and UE-B 360 has previously indicated to UE-A 350 that an in-band signal is to be played when there is a change in the availability of the visual media component. The indication from UE-B 360 to UE-A 350 may be a result of the activation of a feature for visual media component availability via the user interface of UE-B 360. The indication from UE-B 360 to UE-A 350 may be carried in SIP OPTIONS operations such as, for example, SIP OPTIONS operations 307-309. The indication from UE-B 360 to UE-A 350 may also be carried using an in-band signal requested by UE-B 360 to be played in-band to UE-A 350.

In one embodiment of the invention, a sequence of several tones may be sent in order to avoid the sending of false tone signals by the user of UE-A 350. The sequence of tones may vary from handover to handover.

In one embodiment of the invention, there may be several types of first signals, for example, a first type for indicating lack of support for the transfer of PS data while a CS call is active, and a second type for indicating support for the transfer of PS data while a CS call is active.

The embodiments of the invention described hereinbefore pertaining to FIG. 3A may be used in any combination with each other. Several of the embodiments may be combined together to form a further embodiment of the invention.

Figure 3B:
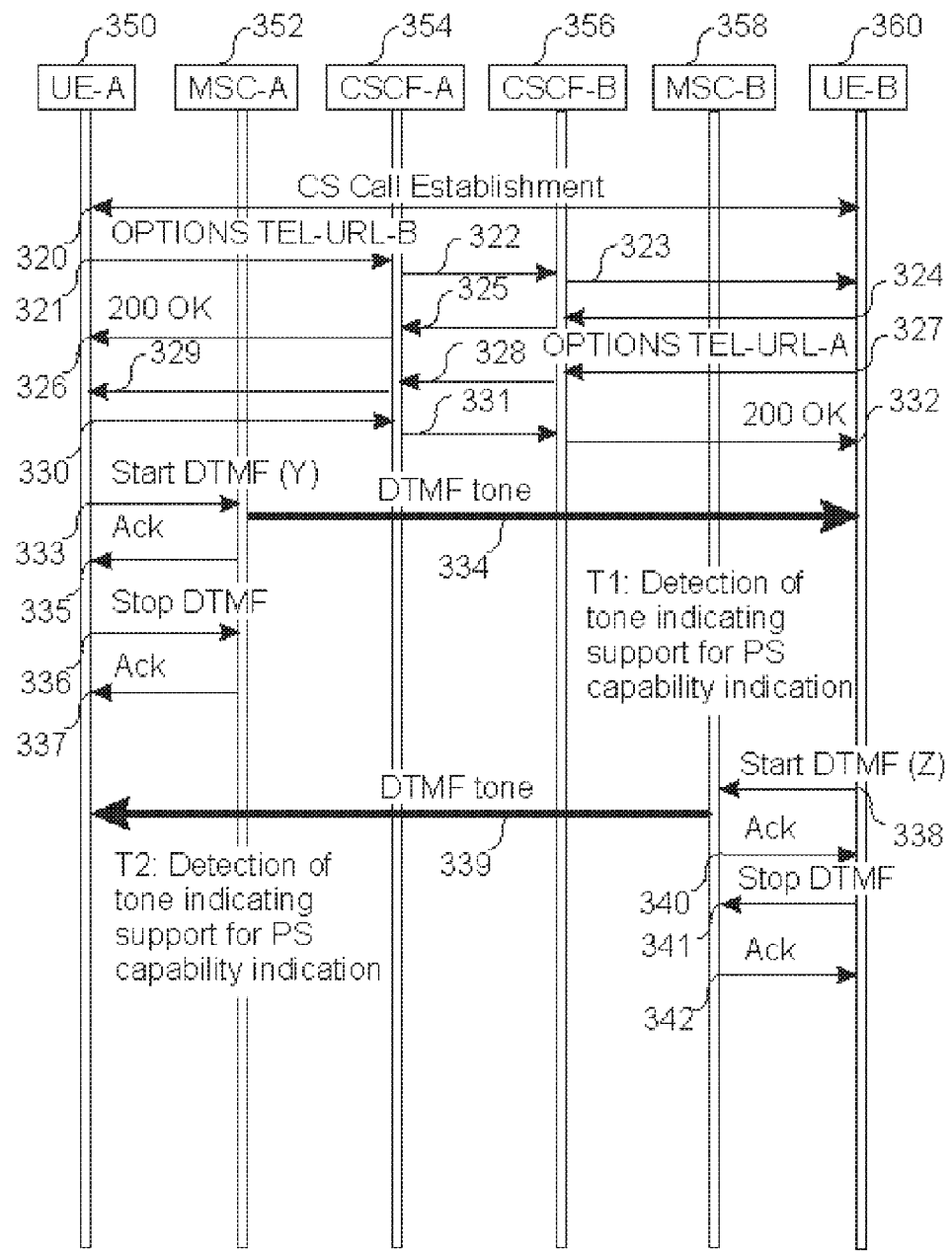
FIG. 3B is a message sequence chart illustrating circuit switched call set-up and subsequent user equipment capability exchange pertaining to the capability of indicating to the remote party support for simultaneous CS call and PS data transfer, in one embodiment of the invention.

FIG. 3B is a message sequence chart illustrating circuit switched call set-up and subsequent user equipment capability exchange pertaining to the capability of indicating support for simultaneous CS call and PS data transfer to the other party, in one embodiment of the invention. The starting point in FIG. 3B is that a CS call 320 is established between a UE-A 350 and a UE-B 360. CS call 320 is established via a MSC-A 352 and a MSC-B 358 in a manner similar to FIG. 3A. The UE capabilities regarding UE-A 350 and UE-B 360 may be exchanged in a manner similar to FIG. 3A, as illustrated with arrows 321-332.

Thereupon, UE-A 350 determines that it supports the capability to indicate support for simultaneous CS call and PS data transfer to UE-B 360. Recall that the PS data transfer is required for the carrying of a visual media component. The indication may be performed using a second in-band signal. As the result of the determination, UE-A 350 sends a start Dual-Tone Multi-Frequency (DTMF) operation 333 to anchor MSC-A 352. In response to start DTMF operation 333, MSC-A 352 starts sending the second in-band signal to UE-B 360, as illustrated with arrow 334. MSC-A 352 acknowledges the starting of the sending of the second in-band signal with operation Ack 335 to UE-A 350. The second in-band signal may be a DTMF tone or any other in-band signal. UE-A 350 requests the stopping of the sending of the second in-band signal with operation stop DTMF 336. The operation stop DTMF 336 is acknowledged by MSC-A 352 using operation Ack 337. The second in-band signal may be played long-enough to ensure a high-enough probability of correct detection at UE-B 360 end. The playing time may be, for example, longer than 0.5 seconds. The playing may also be stopped when an acknowledging in-band signal is received.

At time T1, in response to detecting the second in-band signal UE-B 360 activates the feature of indicating support for simultaneous CS call and PS data transfer to UE-A 350. UE-B 360 may request the starting of the sending of the first in-band signal when it performs a handover to a new radio access network that results in a change in the availability of the transfer of the visual media component over a PS connection while a CS call is active.

Further, in response to detecting the second in-band signal UE-B 360 may send a start Dual-Tone Multi-Frequency (DTMF) operation 338 to MSC-B 358 in order to request the sending of an acknowledgement signal, namely a third in-band signal. The acknowledgement signal is optional. The acknowledgement signal indicates to UE-A 350 that the second in-band signal has been received by UE-B 360 and that it has been understood by the virtue of the UE-B 360 supporting the same feature. In response to start DTMF operation 338, MSC-B 358 starts sending the third in-band signal to UE-A 350, as illustrated with arrow 339. MSC-B 358 acknowledges the starting of the sending of the third in-band signal with operation Ack 340 to UE-B 360. The third in-band signal may be a DTMF tone or any other in-band signal. UE-B 360 requests the stopping of the sending of the third in-band signal with operation stop DTMF 341. The operation stop DTMF 341 is acknowledged by MSC-B 358 using operation Ack 342. The third in-band signal may be played long-enough to ensure a high-enough probability of correct detection at UE-A 350 end. The playing time may be, for example, longer than 0.5 seconds. At time T2, in response to detecting the third in-band signal UE-A 350 activates the feature of indicating UE-A side support for simultaneous CS call and PS data transfer to UE-B 360. In case both UE-A 350 and UE-B 360 initiate the transmission of colliding second in-band signals, one of them decides to recede and sends an acknowledging third in-band signal. The receding UE may be decided based on, for example, a comparison of any UE related identifier.

UE-A 350 may request the starting of the sending of the first in-band signal when it performs a handover to a new radio access network that results in a change in the availability of the transfer of the visual media component over as PS data while a CS call is active.

In one embodiment of the invention, there may be several types of first signals, for example, a first type for indicating lack of support for the transfer of PS data while a CS call is active, and a second type for indicating support for the transfer of PS data while a CS call is active.

Figure 4:
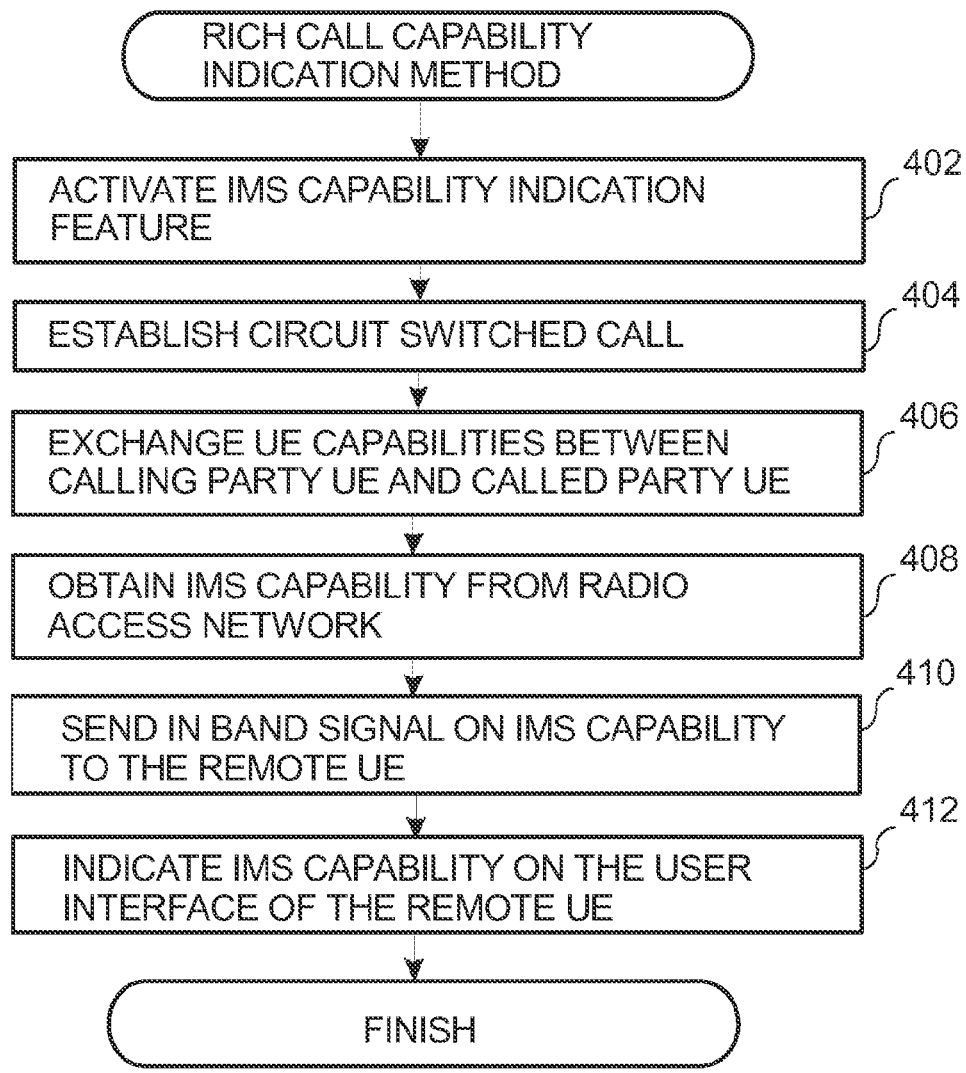
FIG. 4 is flow chart illustrating a rich call related capability exchange method in one embodiment of the invention.

FIG. 4 is flow chart illustrating a rich call related capability exchange method in one embodiment of the invention.

At step 402 the user of a UE such as a mobile station activates a feature for the indication of IMS capability or generally packet switched access when a circuit switched call is active between the UE and a remote UE.

At step 404 a circuit switched call is established between the UE and the remote UE.

At step 406 UE, in one embodiment of the invention, capabilities are exchanged between UE and a remote UE.

At step 408 IMS capability or generally packet switched access is obtained from the radio access network of the UE. The IMS capability may be obtained in response to a handover performed by the UE.

At step 410 an in-band signal is sent from an MSC of the UE towards the remote UE.

At step 412 an indication of IMS capability or the support for the sending of a visual media component during a CS call or generally packet switched access is displayed on the user interface of the remote UE. The indication may also be presented on the user interface of the UE.

Figure 5:
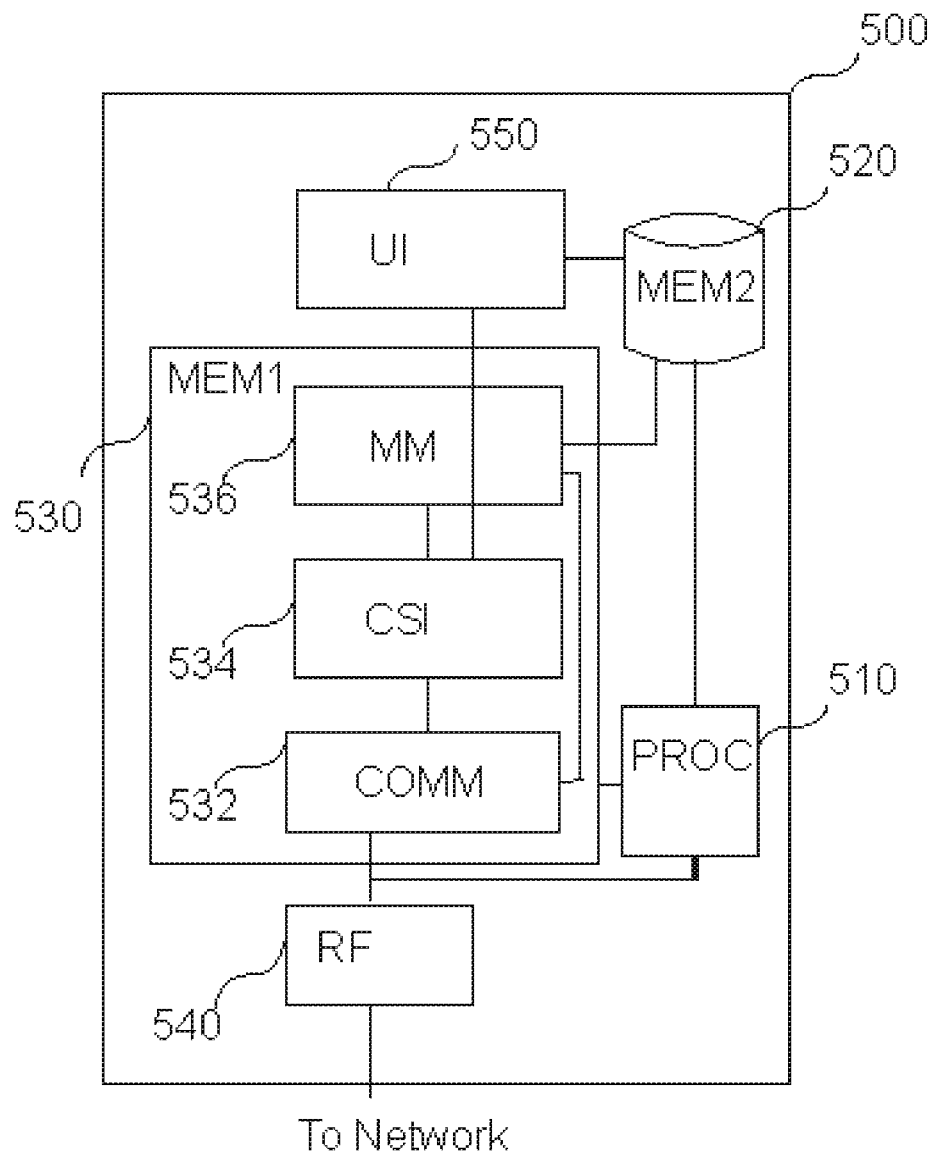
FIG. 5 is a block diagram illustrating a UE in one embodiment of the invention.

FIG. 5 is a block diagram illustrating a UE in one embodiment of the invention. UE 500 comprises at least one processor such as a processor 510, a primary memory 530 and a secondary memory 520. Processor 510 may comprise multiple cores. Primary memory 530 may be a Random Access Memory (RAM). Secondary memory 520 is a non-volatile memory such as, for example, a magnetic or optical disk. UE also comprises a user interface 550 and RF circuitry 540. In memory 530 there is stored software relating to functional entities 532 to 536. There is a communication entity 532 which performs all signaling and user plane transmission related communication tasks. There is a Combined CS and IMS call (CSI) entity 534. There is a Multi-Media (MM) entity 536, which performs the rendering of multimedia to user interface 550. CSI entity 534 performs the presentation of an indication to user interface 550 regarding the current support for simultaneous CS call and PS data transfer in the current situation regarding radio environment. CSI entity 534 may also perform the reception of the in-band signal such as a DTMF signal. In one embodiment of the invention CSI entity 534 is configured to perform at least one of the method steps explained in association with FIG. 4.

When the at least one processor 510 executes functional entities associated with the invention, memory 530 comprises entities such as, any of the functional entities 532-536. The functional entities within apparatus 500 illustrated in FIG. 5 may be implemented in a variety of ways. They may be implemented as processes executed under the native operating system of the network node. The entities may be implemented as separate processes or threads or so that a number of different entities are implemented by means of one process or thread. A process or a thread may be the instance of a program block comprising a number of routines, that is, for example, procedures and functions. The functional entities may be implemented as separate computer programs or as a single computer program comprising several routines or functions implementing the entities. The program blocks are stored on at least one computer readable medium such as, for example, a memory circuit, memory card, magnetic or optic disk. Some functional entities may be implemented as program modules linked to another functional entity. The functional entities in FIG. 5 may also be stored in separate memories and executed by separate processors, which communicate, for example, via a message bus or an internal network within the network node. An example of such a message bus is the Peripheral Component Interconnect (PCI) bus.

The exemplary embodiments of the invention can be included within any suitable device, for example, including any suitable servers, workstations, PCs, laptop computers, PDAs, Internet appliances, handheld devices, cellular telephones, wireless devices, other devices, and the like, capable of performing the processes of the exemplary embodiments, and which can communicate via one or more interface mechanisms, including, for example, Internet access, telecommunications in any suitable form (for instance, voice, modem, and the like), wireless communications media, one or more wireless communications networks, cellular communications networks, 3 G communications networks, 4 G communications networks, Public Switched Telephone Network (PSTNs), Packet Data Networks (PDNs), the Internet, intranets, a combination thereof, and the like.

It is to be understood that the exemplary embodiments are for exemplary purposes, as many variations of the specific hardware used to implement the exemplary embodiments are possible, as will be appreciated by those skilled in the hardware art(s). For example, the functionality of one or more of the components of the exemplary embodiments can be implemented via one or more hardware devices.

The exemplary embodiments can store information relating to various processes described herein. This information can be stored in one or more memories, such as a hard disk, optical disk, magneto-optical disk, RAM, and the like. One or more databases can store the information used to implement the exemplary embodiments of the present inventions. The databases can be organized using data structures (e.g., records, tables, arrays, fields, graphs, trees, lists, and the like) included in one or more memories or storage devices listed herein. The processes described with respect to the exemplary embodiments can include appropriate data structures for storing data collected and/or generated by the processes of the devices and subsystems of the exemplary embodiments in one or more databases.

All or a portion of the exemplary embodiments can be implemented by the preparation of application-specific integrated circuits or by interconnecting an appropriate network of conventional component circuits, as will be appreciated by those skilled in the electrical art(s).

As stated above, the components of the exemplary embodiments can include computer readable medium or memories according to the teachings of the present inventions and for holding data structures, tables, records, and/or other data described herein. Computer readable medium can include any suitable medium that participates in providing instructions to a processor for execution. Such a medium can take many forms, including but not limited to, non-volatile media, volatile media, transmission media, and the like. Non-volatile media can include, for example, optical or magnetic disks, magneto-optical disks, and the like. Volatile media can include dynamic memories, and the like. Transmission media can include coaxial cables, copper wire, fiber optics, and the like. Transmission media also can take the form of acoustic, optical, electromagnetic waves, and the like, such as those generated during radio frequency (RF) communications, infrared (IR) data communications, and the like. Common forms of computer-readable media can include, for example, a floppy disk, a flexible disk, hard disk, magnetic tape, any other suitable magnetic medium, a CD-ROM, CDRW, DVD, any other suitable optical medium, punch cards, paper tape, optical mark sheets, any other suitable physical medium with patterns of holes or other optically recognizable indicia, a RAM, a PROM, an EPROM, a FLASH-EPROM, any other suitable memory chip or cartridge, a carrier wave or any other suitable medium from which a computer can read.

While the present inventions have been described in connection with a number of exemplary embodiments, and implementations, the present inventions are not so limited, but rather cover various modifications, and equivalent arrangements, which fall within the purview of prospective claims.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. A communication method, comprising:
   establishing a circuit switched call between a first electronic device and a second electronic device over a circuit switched communication system, the first electronic device comprising a user equipment;
   receiving a handover indication in the first electronic device;
   receiving radio access network information in association with the handover indication in the first electronic device;
   determining in the first electronic device using the radio access network information whether at least one of a radio access network and an Internet Protocol connectivity access network associated with the radio access network supports simultaneous circuit switched call and a packet switched session carrying at least one media component;
   requesting an in-band signal transmission to the second electronic device for indicating availability of packet switched data transfer during the circuit switched call, the request for the in-band signal transmission being sent when the first electronic device performs a handover to a new radio access network, the handover resulting in a change in the availability of the simultaneous circuit switched call and the packet switched session carrying at least one media component; and
   establishing a media component between the first electronic device and the second electronic device over a packet switched communication system.

2. The method according to claim 1, further comprising:
   detecting the in-band signal in the second electronic device; and
   indicating the availability of at least one type of media component during the circuit switched call on a user interface of the second electronic device.

3. The method according to claim 1, further comprising:
   activating a feature for indicating the availability of the at least one type of media component during the circuit switched call.

4. The method according to claim 1, further comprising:
requesting a start of the in-band signal from a core network node associated with the first electronic device.

5. The method according to claim 4, further comprising:
allowing the in-band signal to play long-enough to avoid distortion due to at least one of speech coding and radio transmission errors;
requesting a stop of the in-band signal from the core network node associated with the first electronic device.

6. The method according to claim 4, wherein the core network node comprises a mobile services switching center or a mobile services switching center server.

7. The method according to claim 1, further comprising:
obtaining the radio access network information to an execution environment within the first electronic device; and
requesting the sending of the in-band signal by the execution environment.

8. The method according to claim 1, wherein the first electronic device and the second electronic devices comprise mobile communication network mobile stations.

9. The method according to claim 1, wherein the packet switched communication system comprises an IP multimedia subsystem.

10. The method according to claim 1, wherein the at least one media component comprises at least one of a video stream, a still picture sequence and a data message sequence.

11. The method according to claim 1, wherein the in-band signal comprises at least one Dual Tone Multiple Frequency signal.

12. A communications system, comprising:
a first electronic device configured to establish a circuit switched call between the first electronic device and a second electronic device over a circuit switched network, the first electronic device comprising a user equipment, to receive a handover indication, to receiving radio access network information in association with the handover indication, to determine using the radio access network information whether at least one of a radio access network and an Internet Protocol connectivity access network associated with the radio access network supports simultaneous circuit switched call and a packet switched session carrying at least one media component, to request an in-band signal transmission to the second electronic device for indicating availability of packet switched data transfer during the circuit switched call, the request for the in-band signal transmission being sent when the first electronic device performs a handover to a new radio access network, the handover resulting in a change in the availability of the simultaneous circuit switched call and the packet switched session carrying at least one media component, and to establish a media component between the first electronic device and the second electronic device over a packet switched network;
the second electronic device being configured to detect the in-band signal and to indicate an availability of at least one type of media component during the circuit switched call on a user interface;
the circuit switched network; and
the packet switched network.

13. A user equipment, comprising:
a memory and a processor configured
to establish a circuit switched call between the first electronic device and a second electronic device over a circuit switched network,
to receive a handover indication, to receiving radio access network information in association with the handover indication,
to determine using the radio access network information whether at least one of a radio access network and an Internet Protocol connectivity access network associated with the radio access network supports simultaneous circuit switched call and a packet switched session carrying at least one media component,
to request an in-band signal transmission to the second electronic device for indicating availability of packet switched data transfer during the circuit switched call, the request for the in-band signal transmission being sent when the first electronic device performs a handover to a new radio access network, the handover resulting in a change in the availability of the simultaneous circuit switched call and the packet switched session carrying at least one media component, and
to establish a media component between the first electronic device and the second electronic device over a packet switched network.

14. A computer program stored on a non-transitory computer readable medium comprising code adapted to perform the following steps when executed on a data-processing system:
establishing a circuit switched call between a first electronic device and a second electronic device over a circuit switched communication system, the first electronic device comprising a user equipment;
receiving a handover indication in the first electronic device;
receiving radio access network information in association with the handover indication in the first electronic device;
determining in the first electronic device using the radio access network information whether at least one of a radio access network and an Internet Protocol connectivity access network associated with the radio access network supports simultaneous circuit switched call and a packet switched session carrying at least one media component;
requesting an in-band signal to the second electronic device for indicating an availability of packet switched data transfer during the circuit switched call, the request for the in-band signal transmission being sent when the first electronic device performs a handover to a new radio access network, the handover resulting in a change in the availability of the simultaneous circuit switched call and the packet switched session carrying at least one media component; and
establishing a media component between the first electronic device and the second electronic device over a packet switched communication system.

15. The computer program according to claim 14, wherein said non-transitory computer readable medium is a removable memory card, a holographic memory, a magnetic disk or an optical disk.

* * * * *